United States Patent [19]

Hiramatsu

[11] Patent Number: 4,638,364
[45] Date of Patent: Jan. 20, 1987

[54] AUTO FOCUS CIRCUIT FOR VIDEO CAMERA

[75] Inventor: Tatsuo Hiramatsu, Higashiosaka, Japan

[73] Assignee: Sanyo Electric Co., Ltd., Moriguchi, Japan

[21] Appl. No.: 791,843

[22] Filed: Oct. 28, 1985

[30] Foreign Application Priority Data

Oct. 30, 1984 [JP] Japan .................................. 59-228308

[51] Int. Cl.$^4$ ............................................. H04N 5/232
[52] U.S. Cl. ..................................... 358/227; 354/402
[58] Field of Search ................. 358/227; 354/400, 402

[56] References Cited

U.S. PATENT DOCUMENTS

| | | | |
|---|---|---|---|
| 3,896,304 | 7/1975 | Aoki et al. | 354/402 |
| 4,392,726 | 7/1983 | Kimura | 354/402 |
| 4,411,505 | 10/1983 | Sakai et al. | 354/402 |
| 4,437,743 | 3/1984 | Sakai et al. | 354/412 |
| 4,527,879 | 7/1985 | Hosoe et al. | 354/400 |
| 4,591,919 | 5/1986 | Kanedu et al. | 354/402 |

Primary Examiner—Russell E. Adams
Attorney, Agent, or Firm—Armstrong, Nikaido, Marmelstein & Kubovcik

[57] ABSTRACT

An auto focus circuit for a video camera comprises an A-D converting circuit (7) for converting to a digital amount a high frequency component absolute value output of a luminance signal in a sampling area for focusing. The A-D converting circuit (7) is connected so that the high frequency component absolute value output of a luminance signal is directly converted to a digital amount. Then, the signal converted to a digital amount is added in an integrating circuit (12) for each field and the signal amount in one field and the signal amount in the coming one field ahead of it or behind it are compared in a comparing circuit (10) so that the output of comparison serves for control of focusing. Thus, addition processing of the high frequency component of the luminance signal, that is, averaging processing is performed digitally in the integrating circuit (12). Accordingly, as compared with the case of analog averaging processing of a signal, the processing operation is stable and as a result the focusing precision is improved.

9 Claims, 3 Drawing Figures

AUTO FOCUS CIRCUIT FOR VIDEO CAMERA

BACKGROUND OF THE INVENTION

1. Field of the Invention.

The present invention relates to an improvement of an auto focus circuit adopted in a video camera.

Particularly, the present invention relates to an improvement of an auto focus circuit of a system in which an input video signal is evaluated to control the movement of a focusing ring by a closed loop.

2. Description of the Prior Art

In the prior art concerning an auto focus circuit of a video camera, two methods are known: a method in which the movement of a focusing ring is controlled by an open loop and a method in which the movement of a focusing ring is controlled by a closed loop by evaluating a video signal. The former method has disadvantages that erroneous operation is liable to occur due to changes in the environmental conditions such as application of an external light and the range of measurement cannot be changed according to the change in a zoom state. As a result, there is an increasing tendency to use the latter method recently.

In the latter closed-loop control method, generally, a high frequency component of a luminance signal corresponding to the central portion of a screen region recorded is sampled and an absolute value of the high frequency component is obtained so that focusing is controlled according to the magnitude of the absolute value. A concrete example of such technology is shown for example on pages 75 to 80 of the journal "Television Technics & Electronics" issued by Electronics Technical Publishing Company in February 1983.

FIG. 1 is a block diagram showing an example of such a well-known auto focus circuit for a video camera as described above.

Referring to FIG. 1, a luminance signal Y contained in a video signal obtained by video recording is applied to a gate circuit 1. The gate circuit 1 selects a luminance signal Y corresponding to the sampling area in the center of the screen region. For this purpose, a gate control circuit 2 controls an open period of the gate circuit 1 based on the output of a synchronizing separation circuit 3. The output of the gate circuit 1 is applied to a high-pass filter 4 for cutting off the signal lower than 100 kHz. The output of the filter 4 attains the maximum level in a state in which the video camera is focused. This is because as the outline of an object to be recorded comes into focus to become clearer, a more marked change is produced in the rise or the fall of an input luminance signal Y in the outline portion and the high frequency component becomes larger. The output of the high-pass filter 4 is supplied to an absolute value calculating circuit 5 and then it is integrated for each field in an average value calculating circuit 6. The integrated average value output is converted to a digital signal with a cycle of one field in an analog-to-digital (A-D) converting circuit 7. The converted output is written in a first memory circuit 8 and then written in a second memory circuit 9 after one field. The writing in the first memory circuit 8 and the second memory circuit is controlled by a vertical synchronizing signal V from the synchronizing separation circuit 3.

The output of the first memory circuit 8 and the output of the second memory circuit 9 are compared in a comparing circuit 10 and the output of comparison is supplied to a focusing motor control circuit 11. The focusing motor control circuit 11 rotates in an initialized state, a focusing motor (not shown) in a predetermined direction and the rotation in this direction is maintained as far as the output of the first memory circuit 8 is larger than the output of the second memory circuit 9. On the contrary, if the output of the first memory circuit 8 is smaller than the output of the second memory circuit 9, the focusing motor is controlled to rotate in the opposite direction. Thus, the focusing motor is controlled so that the average level of the high frequency component contained in the luminance signal is always maximum.

However, if the absolute value output is averaged in the form of an analog signal not converted, the average level is considerably changed dependent on the scene to be recorded. More specifically stated, the average output for recording a scene where there is a considerable change of the luminance in the horizontal direction is ten times as large as the average output for recording a scene where there is little change of the luminance in the horizontal direction. As a result, it is difficult to determine an A-D conversion range for the average output the value of which increases or decreases considerably. Accordingly, if the A-D conversion range is adapted for a high average output, the resolution for a low average output is decreased and the function of response for control is deteriorated. On the contrary, if the A-D conversion range is adapted for a low average level, a saturation of the conversion range with respect to a high average output becomes a problem.

For this reason, in a conventional circuit, the A-D conversion range is adapted for a low average value output and an average value output level exceeding the A-D conversion range is detected by a saturation level detecting circuit 12 so that the output of the gate control circuit 2 is controlled. By this control, scanning lines in the sampling area are decreased by every other line, every two lines, every three lines, etc. so that the average output is not saturated.

Accordingly, if there is a considerable change in the luminance in the horizontal direction of an object to be recorded, sampling intervals are made less frequent. In the case of an object having little correlation in the vertical direction, erroneous operation might occur in focusing.

SUMMARY OF THE INVENTION

An object of the present invention is to provide an auto focus circuit for a video camera, capable of focusing with high precision without being influenced by the environmental conditions for video recording, in other words, irrespective of the change in the luminance of an object to be recorded.

The present invention is an auto focus circuit for a video camera, in which a change in the absolute value output of a high frequency component of a luminance signal in the sampling area for focusing is converted directly to a digital amount and the averaging of the signal is performed by digital processing.

According to the present invention, the averaging of the high frequency component of the luminance signal is digitally performed and as compared with the case of analog processing for averaging the signal, the operation is stable. Consequently, the focusing precision based on the averaged signal is improved.

In addition, if in processing a digital signal, an address circuit and a memory circuit by an integrating circuit comprising an addition circuit and a latch circuit, an auto focus circuit of a simple structure having a small storage capacity can be obtained.

These objects and other objects, features, aspects and advantages of the present invention will become more apparent from the following detailed description of the present invention when taken in conjunction with the accompanying drawings.

DESCRIPTION OF PREFERRED EMBODIMENTS

Figure 1:
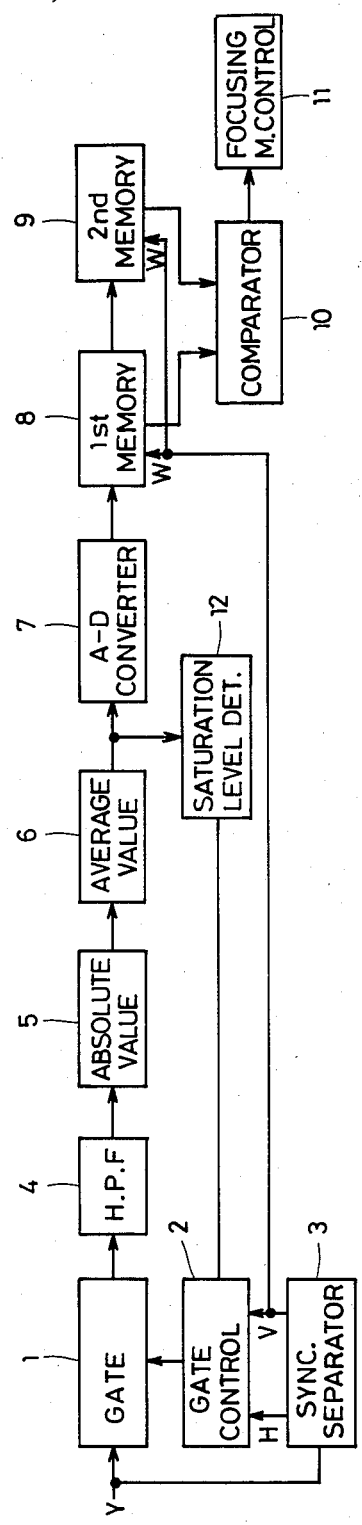
FIG. 1 is a block diagram showing an example of a conventional auto focus circuit for a video camera.
Figure 2:
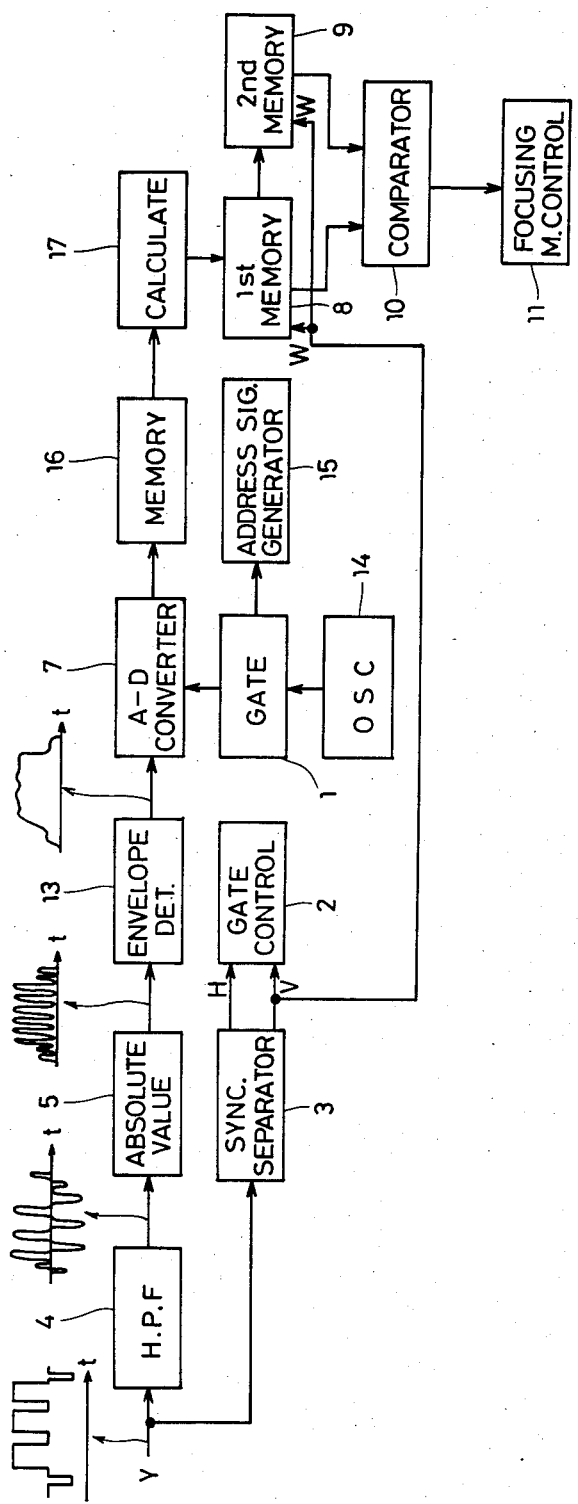
FIG. 2 is a block diagram showing an auto focus circuit of the first embodiment of the present invention.

FIG. 2 is a block diagram of an auto focus circuit of the first preferred embodiment of the present invention.

Referring to FIG. 2, a luminance signal Y contained in a video signal obtained by recording is supplied to a high-pass filter 4. In the high-pass filter 4, a high frequency component higher than 100 kHz is separated from the luminance signal. Then, the separated high frequency component is supplied to an absolute value calculating circuit 5. In the absolute value calculating circuit 5, an absolute value of the signal is obtained and the absolute value output is supplied to an envelope detecting circuit 13. In the envelope detecting circuit 13, an envelope of the absolute value output is detected. The detected output is supplied to an analog-to-digital (A-D) converting circuit 7. The A-D converting circuit 7 converts the received analog envelope detection signal to a digital signal during a predetermined period. Now, in the following, this period for conversion will be described.

A pulse generating circuit 14 generates a pulse signal of 5 MHz and the pulse signal is supplied to the A-D converting circuit 7 through a gate circuit 1. The A-D converting circuit 7 performs digital conversion of the input signal in synchronism with the applied pulse signal only in a period in which the pulse signal is applied thereto from the gate circuit 1.

Control of the opening and closing of the gate circuit 1 is made by a gate control circuit 2. The gate control circuit 2 controls the gate circuit 1 so that the gate circuit 1 is opened only in a period corresponding to a predetermined sampling area in the screen region. More specifically, the sampling area is defined by a range from ¼ to ¾ of a dimension of the screen region in the horizontal direction and a range from ¼ to ¾ of a dimension of the screen region in the vertical direction and control is made to open the gate circuit 1 only in the period corresponding to the above described sampling area. To the gate control circuit 2, a horizontal synchronizing signal H and a vertical synchronizing signal V separated from the input luminance signal Y by the synchronizing separation circuit 3 are supplied as a control input for determining the sampling area. Also, the pulse signal from the pulse generating circuit 14 may be applied to the gate control circuit 2 for determining the sampling area. (The line for applying the pulse signal is not shown.)

The digital signal of eight bits for example, converted by the A-D converting circuit 7 is supplied to a memory circuit 16. The writing in the memory circuit 16 is controlled by an address signal generating circuit 15 using the output of the gate circuit 1 as a count input. Thus, the digital signal from the A-D converting circuit 7 is written successively in a prescribed area in the memory circuit 16 according to the output of the address signal generating circuit 15. After the signal for one field is written, the output of the memory circuit 16 is applied to a calculating circuit 17. The calculating circuit 17 adds all the digital signal values in the sampling area in one field. Then, the output of calculation obtained by the addition is first stored in a first memory 8 and then transferred to a second memory 9 in the subsequent field. More specifically, the writing in the first memory 8 and the second memory 9 is controlled by the vertical synchronizing signal V provided from the synchronizing separation circuit 3 so that the writing is performed for each field. Otherwise, the writing in the first memory 8 and the second memory 9 is controlled by the divided vertical synchronizing signal provided from a frequency divider (not shown) so that the writing is performed for each predetermined period, for example, ½ field, 2 fields etc.

A comparing circuit 10 receiving both of the output of the first memory 8 and the output of the second memory 9 compares the added value in one field and the added value in the subsequent field in the sampling area. Then, the output of comparison is supplied to a focusing motor control circuit 11.

The focusing motor control circuit 11 rotates in an initialized state the focusing motor not shown in a predetermined direction. The rotation in the above stated direction is continued as far as the output of the second memory 9 is smaller than the output of the first memory 8. On the contrary, if the output of the second memory 9 becomes larger than the output of the first memory 8 and the output level of the comparing circuit 10 is reversed, the focusing motor control circuit 11 reverses the rotating direction of the focusing motor. Thus, by means of the focusing motor, the focusing ring (not shown) is always moved to a position in focus.

Figure 3:
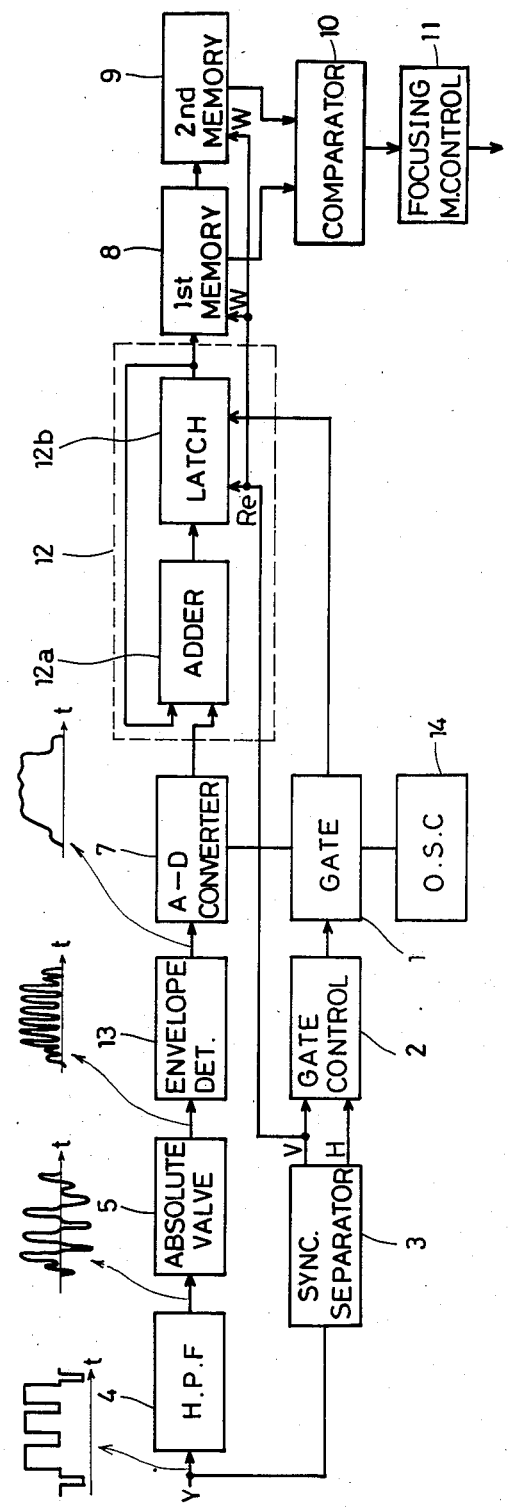
FIG. 3 is a block diagram showing an auto focus circuit of the second embodiment of the present invention.

FIG. 3 is a block diagram of an auto focus circuit of the second preferred embodiment of the present invention.

Referring to FIG. 3, a luminance signal Y contained in a video signal obtained by recording is supplied to a high-pass filter 4. Through the high-pass filter 4, a high frequency component higher than 100 kHz is separated from the luminance signal. Then, the separated high frequency component is supplied to an absolute value calculating circuit 5. In the absolute value calculating circuit 5, an absolute value of the signal is obtained and the absolute value output is supplied to an envelope detecting circuit 13. In the envelope detecting circuit 13, an envelope of the absolute value output is detected. Then, the detected output is supplied to an analog-to-digital (A-D) converting circuit 7. The A-D converting circuit 7 converts the received analog envelope detection signal to a digital signal during a predetermined period.

On the other hand, the luminance signal Y is also supplied to a synchronizing separation circuit 3. In the synchronizing separation circuit 3, a horizontal synchronizing signal H and a vertical synchronizing signal V are separated from the luminance signal Y. The separated horizontal synchronizing signal H and vertical synchronizing signal V are supplied to a gate control circuit 2. The gate control circuit 2 controls a gate circuit 1 so that the gate circuit 1 is opened only in a period corresponding to a predetermined sampling area in the screen region. More specifically, the sampling area is defined by a range from ¼ to ¾ of a dimension of the screen region in the horizontal direction and a range from ¼ to ¾ of a dimension of the screen region in the vertical direction and the opening of the gate circuit 1 is controlled so that the signal in the sampling area is extracted. The sampling area is not limited to the area as defined above and may be an arbitrary region in the screen region. Otherwise, the sampling area may be variable by selecting operation. In addition, to the gate circuit 1, a pulse signal of 5 MHz is supplied from a pulse generating circuit 14. In consequence, the pulse signal of 5 MHz is supplied to the A-D converting circuit 7 in a period in which the gate circuit 1 is opened by the gate control circuit 2, and with the timing of the pulse signal, the analog envelope detecting signal is converted to a digital signal of eight bits for example. The pulse signal provided from the gate circuit 1 is supplied as a latch pulse to a latch circuit 12b in an integrating circuit 12 to be described later. The pulse signal from the pulse generating circuit 14 may be applied to the gate control circuit 2 for determining the sampling area.

The digital signal thus converted is integrated for each field in the integrating circuit 12 in the next stage. More specifically, the integrating circuit 12 comprises an addition circuit 12a and a latch circuit 12b. The addition circuit 12a has a closed loop structure in which the digital signal provided from the A-D converting circuit 7 and the digital signal provided from the latch circuit 12b are added and the output of addition is supplied to the latch circuit 12b.

The latch circuit 12b latches the input signal according to the latch pulse supplied from the above stated gate circuit 1. The latch circuit 12b is reset by the vertical synchronizing signal V supplied from the synchronizing separation circuit 3. Thus, the latch circuit 12b integrates the output of the A-D converting circuit 7 by a field cycle.

On the output side of the latch circuit 12b, a first memory 8 is connected and to the first memory 8, a second memory 9 is connected. Both of the memories 8 and 9 are controlled by the vertical synchronizing signal V so that writing operation is performed in the memories 8 and 9. The memories 8 and 9 provide the signals stored at present as far as new data is not written. These first memory 8 and second memory 9 are formed by D-flip-flops for example.

As described previously, the resetting of the latch circuit 12b and the writing of the first memory 8 and the second memory 9 are controlled in synchronism with the vertical synchronizing signal V. Accordingly, for each field, the content of the latch circuit 12b is written in the first memory 8 and with a delay of one field, the content is written in the second memory 9. Instead of using the vertical synchronizing signal V, a divided vertical synchronizing signal can be used as a control signal. In such a case, for each predetermined period, for example, ½ field or 2 fields etc. the content of the latch circuit 12b is written in the first memory 8 and, with a delay of one predetermined period, the content is written in the second memory 9. Then, a comparing circuit 10 receiving the output of the first memory 8 and the output of the second memory 9 compares by a field cycle, the digital converted data in one field (this data being supplied from the second memory 9) and the digital converted data in the field coming one field ahead of the above stated field (this data being supplied from the first memory 8) and the output of comparison is supplied to a focusing motor control circuit 11. The focusing motor control circuit 11 controls the focusing motor in the same manner as in the first embodiment and the prior art so that the most suitable focusing operation is performed.

Thus, in both of the first embodiment and the second embodiment, processing of the signal after A-D conversion, that is, addition, writing and other processing of the digital signal are performed with predetermined timing based on the vertical synchronizing signal V separated from the luminance signal Y. However, it is to be noted that such processing of the digital signal can be performed using software, in other words, a microcomputer provided with a program for desired operation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An auto focus circuit for a video camera including a focusing motor for focusing, comprising:
   a high-pass filter circuit to which a luminance signal of a video signal is applied so that a high frequency component higher than a predetermined frequency is extracted from said applied luminance signal,
   an absolute value calculating circuit connected to said high-pass filter circuit for obtaining an absolute value of the output of said high-pass filter circuit, an A-D converting circuit connected to said absolute value calculating circuit for converting an analog absolute value output signal provided from said absolute value calculating circuit to a digital signal,
   a calculating circuit connected to said A-D converting circuit for adding the converted digital signal with a predetermined period cycle,
   a comparing circuit connected to said calculating circuit for comparing the output of calculation in one predetermined period and the output of calculation in the predetermined period coming one predetermined period ahead of said predetermined period, and
   a focusing motor control circuit connected to said comparing circuit for providing a signal for controlling the rotation of the focusing motor included in said video camera in the clockwise direction or in the counterclockwise direction based on the output of said comparing circuit.

2. An auto focus circuit in accordance with claim 1, wherein
   said predetermined period comprises one field.

3. An auto focus circuit in accordance with claim 2, wherein
   said A-D converting circuit converts said applied analog absolute value signal to a digital signal for each field only in a predetermined sampling period and provides said digital signal as an output.

4. An auto focus circuit in accordance with claim 3, further comprising:
   a synchronizing separation circuit to which said luminance signal is applied so that a horizontal synchronizing signal and a vertical synchronizing signal are extracted from said luminance signal, and a sampling period setting circuit connected between said synchronizing separation circuit and said A-D converting circuit for setting a sampling period for each field of said video signal based on said horizontal synchronizing signal and said vertical synchronizing signal so that said A-D converting circuit is enabled only in said sampling period.

5. An auto focus circuit in accordance with claim 4, wherein
the sampling period set by said sampling period setting circuit can be changed by selecting operation.

6. An auto focus circuit in accordance with claim 1, further comprising:
an envelope detecting circuit connected between said absolute value calculating circuit and said A-D converting circuit for detecting and providing as output an envelope of the output signal of said absolute value calculating circuit.

7. An auto focus circuit in accordance with claim 2, wherein
said calculating circuit comprises:
a latch circuit operating with a cycle of one field for latching an input signal for one field, and
an addition circuit for adding the output from said A-D converting circuit and the output from said latch circuit so that the signal obtained by said addition is applied to said latch circuit.

8. An auto focus circuit in accordance with claim 2, wherein
said comparing circuit comprises:
a first memory for writing the output of said calculating circuit for each field,
a second memory for writing the content written by said first memory with a delay of one field, and
a comparator for comparing the content of said first memory and the content of said second memory so that a high level output or a D-level output is provided according to the magnitude relation of said contents.

9. An auto focus circuit in accordance with claim 8, wherein
said first memory and said second memory are both D-flip-flops.

* * * * *